Jan. 28, 1936.  G. H. MATTHES  2,028,794

METHOD OF CONSTRUCTING REVETMENTS

Filed March 13, 1934  4 Sheets-Sheet 1

Inventor
Gerard H. Matthes.
By
Attorney

Jan. 28, 1936.   G. H. MATTHES   2,028,794
METHOD OF CONSTRUCTING REVETMENTS
Filed March 13, 1934    4 Sheets-Sheet 2

Inventor
Gerard H. Matthes
By
Attorney

Inventor
Gerard H. Matthes
By
Attorney.

Patented Jan. 28, 1936

2,028,794

UNITED STATES PATENT OFFICE 2,028,794

METHOD OF CONSTRUCTING REVETMENTS

Gerard H. Matthes, Los Angeles, Calif.

Application March 13, 1934, Serial No. 715,332

2 Claims. (Cl. 61—37)

(Granted under the act of March 3, 1883, as amended April 30, 1928; 370 O. G. 757)

This invention described herein may be manufactured and used by or for the Government for governmental purposes, without the payment to me of any royalty thereon.

This invention generically relates to a revetment and a method for producing it; more specifically it is directed to a mattress composed of a plurality of units having a predetermined size, shape and weight, these units when applied in sufficient numbers to the shore, bank and/or bottom of the river or other body of water to be protected functioning to prevent undermining, erosion and scouring.

One object of this invention is to provide a revetment and method of the character specified which will prove especially effective in localities where rock, stone or rip-rap are not readily available and which will afford protection in the nature of a mat or blanket possessing great stability and durability for unconsolidated natural bank material such as sand, loam, gravel and the like.

Another object of this invention is to provide a revetment composed of one or more layers of tetraheron shaped units, the dimensions and mass of each unit being predicated on the tractive force to which it will be subjected when disposed in blanket forming position upon the surface to be protected.

Another object of this invention is to provide a revetment composed of one or more layers of tetrahedron shaped units adapted to be applied to a suitably prepared base, the respective units being interspersed with gravel or other appropriate aggregate, the latter serving to prevent destruction of the bank by the erosive action of the water and effecting equalization of the hydrostatic pressure upon opposite faces of the revetment.

Another object of this invention is to afford a revetment involving a series of tetrahedron shaped units which may be placed in position by merely dropping the units into the flowing water, thus making construction practicable at all seasons of the year as long as the water is free from ice interference.

Another object of this invention is to produce a mattress which is peculiarly suitable to the protection of up-stream, down-stream and bottom ends of existing revetments to prevent such revetments being flanked, undermined or otherwise destroyed by flowing water.

Other objects of this invention are to provide a revetment which will cling closely to bank or shore materials to be protected, regardless of the irregularities in their natural surface; which will resist the removal by water of all bank materials from under the revetment; which may be utilized to fill in holes caused by sliding of the bank materials; which may be readily repaired locally without requiring reconstruction on a large scale, and finally a revetment applicable to a wide variety of conditions imposed by currents, depths of water, nature of natural soil conditions and the like.

With these and other objects in view the invention resides in the novel details of construction and combination of parts as will be disclosed more fully hereinafter and particularly pointed out in the claims.

Briefly stated, one form of this invention consists in forming a base of gravel, shells, brick bats, blast furnace slag, broken stone or similar material on the surface to be revetted, applying one or more layers of tetrahedron blocks, each block being formed from concrete, asphalt, clay or other suitable material, and having dimensions and mass calculated to resist the tractive force to which it will be subjected when in place and then interspersing the blocks with a suitable filler material such as gravel, crushed stone and the like, to prevent undermining, scouring and erosion, due to the destructive action of the water.

Referring more particularly to the accompanying drawings in which corresponding parts are indicated by similar reference characters:

Figure 1:
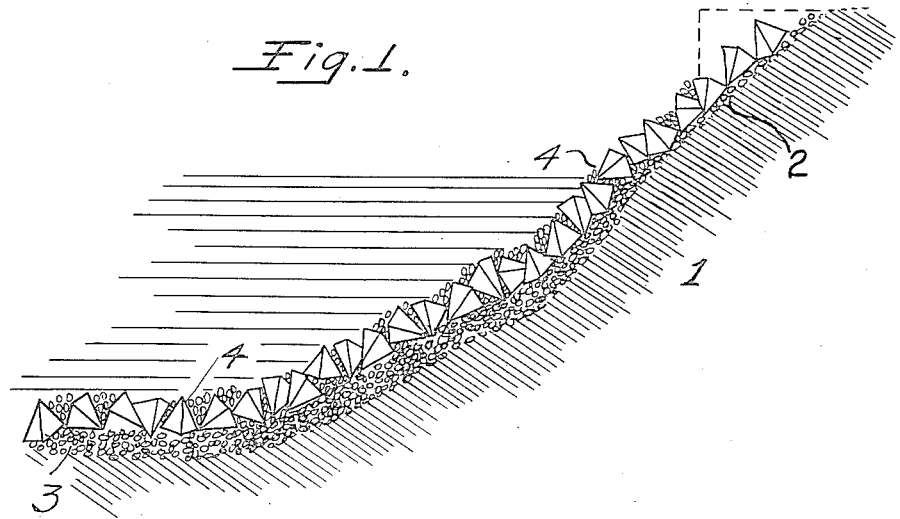
Fig. 1 is a sectional view partly in elevation illustrating a revetment composed of a gravel base, tetrahedron blocks upon the base, and a filler material between the blocks.

The "Underwater survey" conducted by the Mississippi River Commission in 1931, for the purpose of determining the conditions below water level of various types of existing revetments after many years exposure to the action of the waters of the Mississippi River, and conditions above water level during low water stages, disclosed many defects in the various types of revetment, chief of which was the inability of the revetments to hold together when pockets were formed beneath them by the gradual leaching out of bank materials, sliding of portions of the bank, or from undermining of the toe of steeply sloping banks.

This "Underwater survey", which was made by experienced divers, further disclosed that lumber mats and fascine mattresses made of willows, heretofore considered proof against decay when permanently immersed in water, proved to be short-lived, the action of the river water causing the willow boughs to become brittle, or to be worn away by friction in rubbing against each other under the ceaseless motion imparted to them by the surging river waters. It also disclosed that in the case of articulated concrete revetments the wire connections linking the various concrete units to each other frequently rusted away, causing the lower sections of such revetments to be carried away by the current, and leaving remaining sections to project over gaping holes in the bank where the current had undermined the revetment and washed out large volumes of the very bank materials which these articulated revetments were intended to protect and hold in place.

Disruption of the continuity of these types of revetments not only exposed to unprotected bank materials to the erosive action of the water, but actually tended to accelerate such erosive action including bank caving. The principal offenders in this connection have been the frayed end-portions of revetment still in place which sway in the current thus promoting exit of the underlying bank material instead of holding it in place. A common source of failure in revetment construction has been found to be the continuous sifting of the finer particles of bank material through the interstices of the revetment, which permits recession of the bank and its overlying revetments. This notably has been the case with willow, lumber mat, and articulated slab revetments which have been in extensive use on the Mississippi River. Willow and lumber mats, continuous concrete slabs, and articulated concrete revetments are all subject to rupture and disintegration when holes form beneath them, either by sliding of bank portions or washing out of the bank materials.

It is therefore the aim and purpose of this invention to overcome these defects by the provision of a revetment, which will not only preclude the formation of holes beneath the revetment, due to either sliding or washing out of bank materials, but will resist these tendencies by permitting the blocks and gravel to drop into and fill any incipient holes that may be forming.

Another common form of failure observed was bursting of continuous slag revetments due to water pressure underneath or back of the revetment slab. This pressure manifests itself during falling river stages or ebb tides, which relieves the water pressure on the water side. The instant revetment by virtue of the gravel filler material which it contains, functions as a blanket, which, while preventing the fine, erodible, bank materials from sifting through, is nevertheless sufficiently porous to transmit water pressure in either direction, thus effectually equalizing the hydrostatic pressures on the front and back of the revetment, and eliminating dangerous unbalanced pressure heads.

Figure 2:
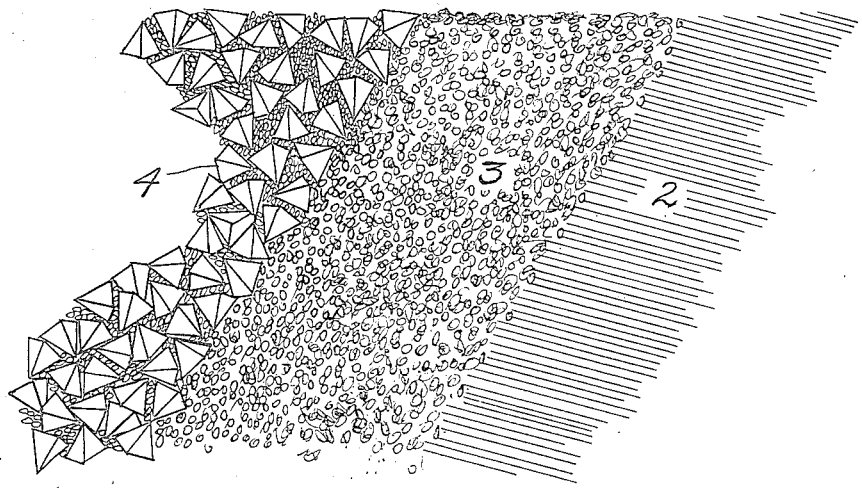
Fig. 2 is a composite plan view of the revetment shown in Fig. 1 and illustrating progressively from right to left the development of the mattress from the bed to the finished product.

In the illustrated embodiment characterizing one form of this invention, reference being had especially to Figs. 1 and 2, there is shown a bank (1) upon the surface (2) of which is laid a suitable base (3). This base may be composed of any locally available material such as gravel, shells and the like. In the construction of the base (3), it will be noted that its thickness is diminished as the upper edge of the bank is approached as clearly shown in Fig. 1 of the drawings.

The base (3) having been laid, the next step in the formation of this revetment resides in the disposition of the blocks (4) upon their base. These blocks (4) may be composed of concrete, asphalt, clay or the like and are preferably in the form of tetrahedrons, as this configuration has been found by laboratory experiment to afford maximum resistance to the dislodging action of the water.

To lay the blocks, a launching barge (not shown) takes a position relative to the bed (2) and commensurate with the strength of the current whereupon the blocks (4) are dropped overboard into the flowing water, through which they gradually sink, until they come to rest upon the bed in various positions shown, some of the blocks penetrating the gravel bed, others resting upon their base, as clearly disclosed in Fig. 1 of the drawings. Experience has indicated that about 150–300 12-inch blocks are necessary to each 10 x 10-foot area of the surface to be revetted.

Various forms of tetrahedron blocks may be resorted to in constructing this revetment and some of these types are illustrated in Figs. 6 to 13 inclusive. In this connection it is to be understood that various combinations of these forms may also be employed if found desirable.

It is conceivable that under some circumstances blocks having a triangular shaped recess in each face as at (6) (Fig. 6), or blocks provided with concave or convex faces (7) and (8), (Figs. 7 to 10 inclusive), may be used if desirable, as these constructions either tend to hold the filler material and the blocks in position against the action of the water, or as in the case of the convex form, permit the weight of the block to be increased without changing its linear dimensions.

Figure 5:
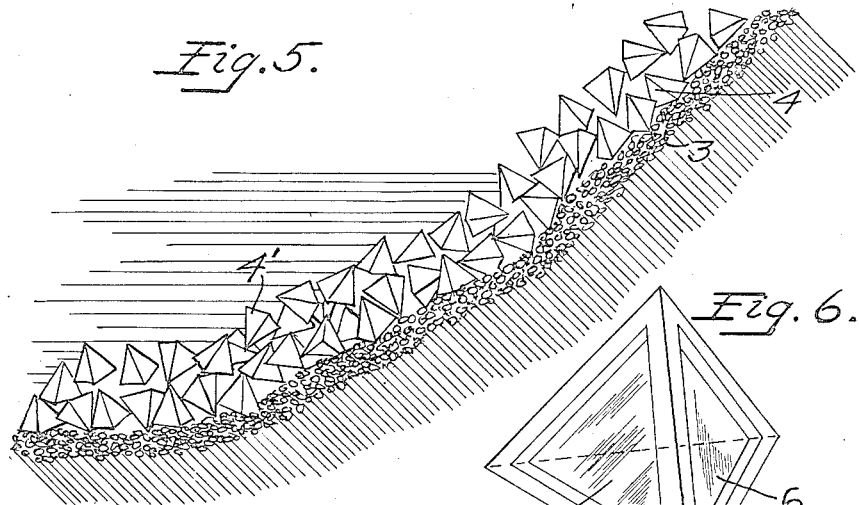
Fig. 5 is a sectional view partly in elevation of a further modified form of revetment embodying a gravel bed with two layers of tetrahedron blocks arranged in superimposed relation, the filler material being omitted.
Figure 6:
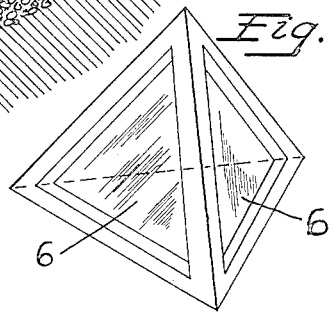
Fig. 6 is a perspective view of a revetment block having a triangular shaped recess formed in each of its sides.
Figure 7:
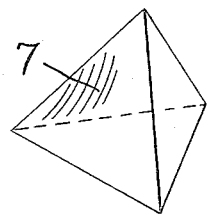
Fig. 7 is a similar view, showing a modified form of revetment block, the sides of which are concave.
Figure 9:
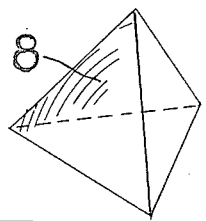
Fig. 9 is a perspective view of a modified form of revetment block having its sides convex.
Figure 11:
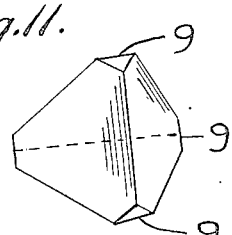
Fig. 11 is a perspective view of a revetment block having portions thereof removed.
Figure 8:
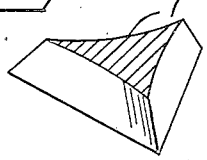
Fig. 8 is a horizontal section of the modification shown in Fig. 7.
Figure 10:
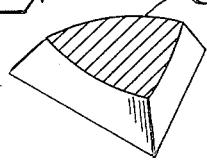
Fig. 10 is a horizontal section of the modification shown in Fig. 9.
Figure 12:
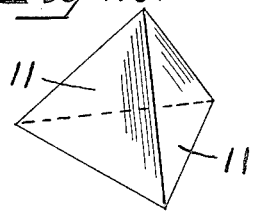
Fig. 12 is a perspective view of the revetment block used in connection with the construction shown in Figs. 1 to 5 inclusive.
Figure 13:
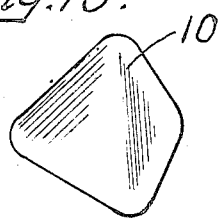
Fig. 13 is a perspective view of a revetment block of the form shown in Fig. 12, but having its edges rounded.

If a revetment is used employing two layers of blocks, as shown in Fig. 5 it might be preferable to use the form of tetrahedron block shown in Fig. 11, wherein the apexes are removed as at (9), since this type facilitates nesting. On the other hand, it may be found desirable to slightly round the corners and edges of the blocks as at (10), (Fig. 13), as this type permits the blocks to be more readily removed from the mold.

In the experimental work on the Mississippi River, the revetments have been composed of the tetrahedron blocks of the type shown in (Fig. 12), that is to say, a block bounded by four equal sized equilateral triangles (11). This block has given excellent results and constitutes the shape of block upon which calculations thus far have been based.

Figure 14:
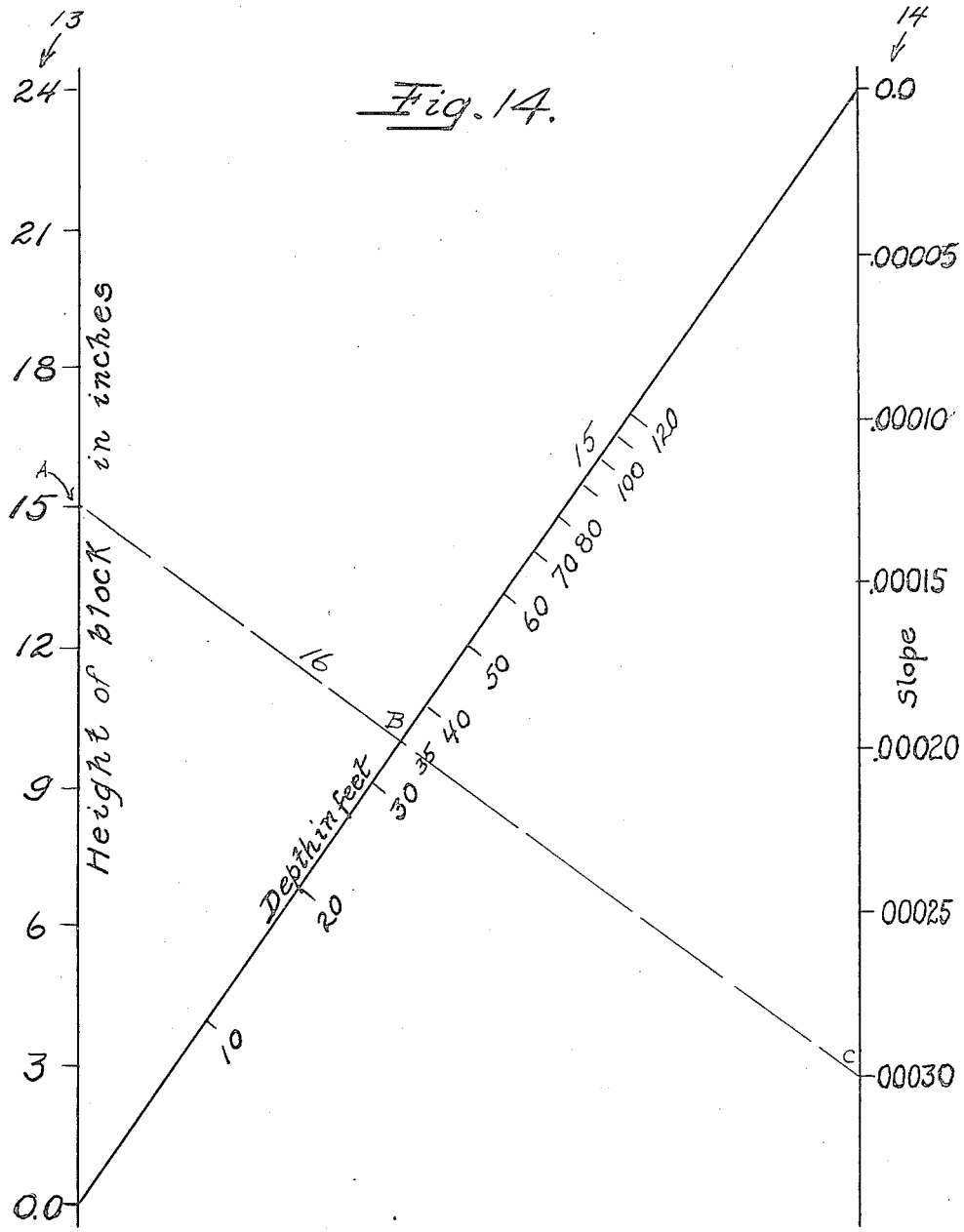
Fig. 14 illustrates a form of diagram for determining the correct size of revetment blocks to be used in a given locality.

Having discussed the various forms of tetrahedron blocks which may be utilized in the construction of this revetment, reference is deemed advisable to the mode of determining the linear measurement and weight of blocks suitable for a given locality. Assuming definite knowledge be at hand relating to the slope and depth of the stream to determine the tractive force of the water to be resisted, a chart may be resorted to such as that shown in Fig. 14 of the drawings. According to this chart, the figures in column (13) designate the heights of tetrahedron blocks, those in column (14), the slopes of water surfaces in terms of fractions of a foot vertically for each foot horizontally, while those in line (15) indicate various depths in feet. With this arrangement a line A—C drawn from a given slope through a point B on the line (15) will afford the minimum height of block required, let us saw, for a depth of 35 feet and a slope of .00030 feet vertically per one foot horizontally. Manifestly line (16) can be drawn similarly for any given combination of depth and slope to the corresponding minimum height of block.

Perhaps one of the most important features to the present invention resides in the construction of each block so that it will have the proper dimensions and weight to withstand the tractive forces to be exerted upon it in the particular locality where used. The tractive force which will be exerted at any point, by flowing water on a block when deposited on the bank or bottom of the body of water to be protected may be expressed by the formula:

$T = WSD$ where $T$ = tractive force in pounds per square foot
$W$ = weight of water per cubic foot
$S$ = slope of the water surface
$D$ = depth in feet of the water at the given point This formula was first derived by DuBoys from a theoretical consideration of the mechanics of flowing water and has been checked in this instance by experiments upon tetrahedron blocks of two different sizes. The formula assumes parallelism of water surface and bed, and non-acceleration of velocity of flow. Such conditions obtained in the tests, and are closely approached in nature. It should be noted that in DuBoys' equation, with W considered constant, T varies with the product of depth and slope; hence if slope and depth vary inversely with each other the value of T is not affected. If, then, the products of several different combinations of slopes and depths at which the blocks are just moved results in a common figure, this figure may be assumed to be the measure of the "critical tractive force" of the blocks (designated $T_o$). Thus the stability of the blocks under any given condition in nature may be determined. Actually, the product SD, designated $T_s$, is usually employed in preference to $T_o$, as considerable multiplication is thereby avoided.

Figure 3:
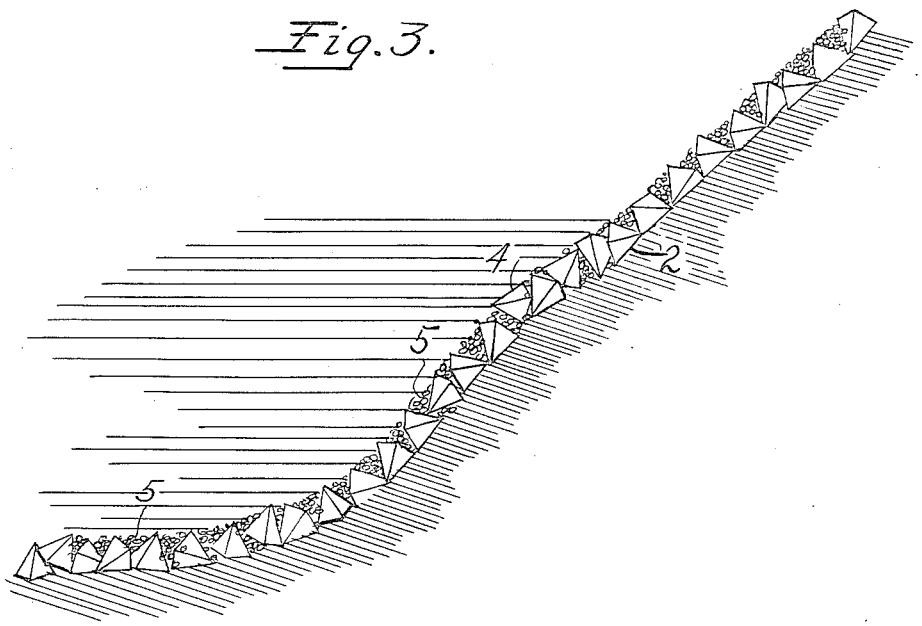
Fig. 3 is a sectional view partly in elevation of a revetment composed of tetrahedron blocks and a filler material, the gravel bed being omitted.
Figure 4:
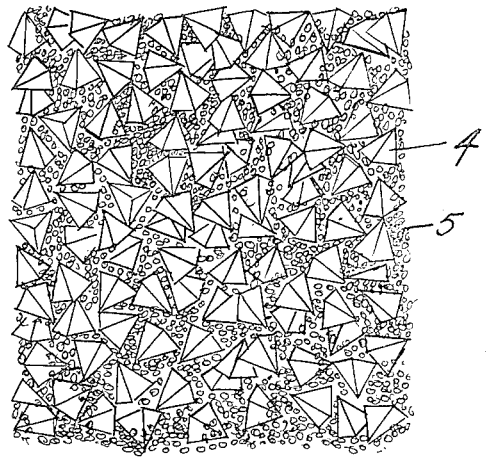
Fig. 4 is a fragmentary plan view of the revetment shown in Fig. 3.

The type of revetment shown in Figs. 1 and 2, as well as the tetrahedron blocks used in connection with such revetment, having been described, reference will now be made to the form of revetment disclosed in Figs. 3 and 4. In accordance with this construction the bed (3) is omitted and the blocks (4) are deposited directly upon the surface (2) to be revetted. After the blocks have been laid as described in connection with Fig. 1, they are interspersed with a filler material (5), as clearly shown in Fig. 3 of the drawings.

This material (5), which may consist of gravel, shells or other similar locally available material, acts as a blanket for the finer erodible bank or bottom materials. A blanket of this character not only prevents the finer erodible materials from being washed from beneath the blocks (4) but also serves to transmit water pressure in either direction, to equalize the pressure on the upper and lower surfaces of the blanket. This filler material in the absence of the blocks (4) to hold it in place would be removed by the action of the water, as will be readily understood without further discussion.

In the light of the preceding disclosure, it is evident that depending upon the exigencies of the situation, various combinations of the components of the revetment under consideration could be resorted to, without departing from the fundamental principles of the invention. For instance, the gravel bed might be omitted, the blocks with filler material being laid directly upon a graded bank as shown in Figs. 3 and 4, of two layers of blocks arranged in superimposed relation and without filler material, might be resorted to, the blocks being deposited upon a gravel bed as shown in Fig. 5. Other modifications of the gravel bed blocks and filler material might include two layers of tetrahedron blocks with filler material, but laid directly upon the bank, or a single layer of blocks laid upon the gravel bed but omitting the filler material. Additional combinations might be given, but it is thought that the foregoing will suffice to indicate various changes which might be resorted to within the scope of this invention.

In conclusion, it will be apparent, the revetment forming the subject matter of this application provides a form of protection for the shores, banks and/or bottoms of rivers or other bodies of water, which compared with the various slab types of revetment is so simple in construction, as to make it practicable for any competent contractor to produce all the blocks and perform all the work required to produce a complete revetment.

Having described my invention, what I claim as new and wish to secure by Letters Patent is:

1. A method of constructing revetments for shores, banks, bottoms of rivers and the like consisting in forming a bed on the surface to be revetted, the bed being of sufficient thickness to preclude the passage therethrough of the finer materials of the revetted surface and composed of an aggregate, the permeability of which will permit equalization of the hydrostatic pressure exerted above and below the bed and then protecting the bed against erosion by depositing thereon a series of blocks shaped to provide a multiplicity of angular projections, the latter functioning to dissipate wave impacts and decelerate water currents in immediate contact with the bed.

2. A method of constructing revetments for shoes, banks, bottoms of rivers and the like consisting in forming a bed on the surface to be revetted, the bed being of sufficient thickness to preclude the passage therethrough of the finer materials of the revetted surface and composed of an aggregate, the permeability of which will permit equalization of the hydrostatic pressure exerted above and below the bed and then protecting the bed against erosion by depositing thereon a series of tetrahedron blocks functioning to dissipate wave impacts and decelerate water currents in immediate contact with the bed.

GERARD H. MATTHES.